US012680586B2

(12) United States Patent (10) Patent No.: US 12,680,586 B2
Owa et al. (45) Date of Patent: Jul. 14, 2026

(54) FRICTION MATERIAL

(71) Applicant: AKEBONO BRAKE INDUSTRY CO., LTD., Tokyo (JP)

(72) Inventors: Kentaro Owa, Tokyo (JP); Motoyuki Miyaji, Tokyo (JP); Takuya Takada, Tokyo (JP); Kenta Kimura, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 871 days.

(21) Appl. No.: 17/770,090

(22) PCT Filed: Oct. 16, 2020

(86) PCT No.: PCT/JP2020/039035
§ 371 (c)(1),
(2) Date: Apr. 19, 2022

(87) PCT Pub. No.: WO2021/079831
PCT Pub. Date: Apr. 29, 2021

(65) Prior Publication Data
US 2022/0381309 A1 Dec. 1, 2022

(30) Foreign Application Priority Data
Oct. 25, 2019 (JP) ................................. 2019-194388

(51) Int. Cl.
*F16D 69/02* (2006.01)
(52) U.S. Cl.
CPC ................................... *F16D 69/026* (2013.01)
(58) Field of Classification Search
CPC ................................... F16D 69/026; C08J 5/04
See application file for complete search history.

(56) References Cited

U.S. PATENT DOCUMENTS 5,288,792 A 2/1994 Buxbaum
2009/0270284 A1* 10/2009 Kikuchi .................. C09C 1/405
508/108

2013/0158162 A1 6/2013 Hatano et al.
2015/0369320 A1* 12/2015 Onda ........................ C08K 3/04
523/156
2016/0221882 A1 8/2016 Muroya et al.
2018/0142748 A1 5/2018 Kobayashi et al.

FOREIGN PATENT DOCUMENTS

| AT | 396 365 B | 8/1993 |
| CN | 105202083 A | 12/2015 |
| CN | 105555900 A | 5/2016 |
| CN | 108679129 A | 10/2018 |
| EP | 0399728 A2 | 11/1990 |
| JP | H03-054298 A | 3/1991 |
| JP | 2000-256651 A | 9/2000 |
| JP | 2006-125618 A | 5/2006 |
| JP | 2017-008167 A | 1/2017 |
| WO | WO-95/02657 A1 | 1/1995 |
| WO | WO-2005/057042 A2 | 6/2005 |
| WO | WO-2012/029923 A1 | 3/2012 |

OTHER PUBLICATIONS

German Office Action issued Nov. 28, 2023 in Application No. 112020005139.0.
Written Opinion of the International Searching Authority issued Dec. 22, 2020 in International Application No. PCT/JP2020/039035.
Chinese Office Action issued Mar. 30, 2023 in Application No. 202080074237.8.
International Search Report mailed Dec. 22, 2020 for PCT/JP2020/039035.
Written Opinion mailed Dec. 22, 2020 for PCT/JP2020/039035.

* cited by examiner

*Primary Examiner* — Robert S Jones, Jr.
*Assistant Examiner* — Elizabeth Amato
(74) *Attorney, Agent, or Firm* — Faegre Drinker Biddle & Reath LLP

(57) ABSTRACT

There is provided a friction material including: a friction modifier; a binder; and a fibrous material. A phosphate-based dispersant is contained as the friction modifier. Preferably, a content of the phosphate-based dispersant is 0.2 mass % to 2.0 mass %. Preferably, the phosphate-based dispersant is at least one selected from a group consisting of sodium hexametaphosphate, sodium polyphosphate, and sodium pyrophosphate.

10 Claims, No Drawings

FRICTION MATERIAL

TECHNICAL FIELD

The present invention relates to a friction material to be used in automobiles, railroad vehicles, industrial machines and the like.

BACKGROUND ART

At the time of rain, washing vehicle, or the like, there is a case where moisture is sufficiently present at an interface between a friction material and a disc rotor which is a counterpart material. When braking is performed in such a state, an abrasion powder generated at the time of the braking and the water present at the interface between the friction material and the disc rotor are kneaded to generate an abrasion powder aggregate.

When the braking is further repeated, the amount of moisture at the interface between the friction material and the disc rotor is reduced, and the aggregation of the abrasion powder aggregate becomes strong. Then, when the abrasion powder aggregate collapses due to a shear force at the time of braking, sliding (stick slip) of the rotor and the friction material occurs repeatedly, vibration is generated, and abnormal noise (hereinafter, sometimes referred to as "abnormal noise during wetting") may occur.

As a friction material capable of suppressing the generation of such an abrasion powder aggregate, for example, Patent Literature 1 discloses a non-asbestos friction material containing a fibrous material, a binder, a lubricant, an inorganic friction modifier, a pH modifier, and a filler as compounding materials, in which at least one of the filler and the inorganic friction modifier is coated with at least one of a fatty acid and a metal soap.

CITATION LIST

Patent Literature

Patent Literature 1: JP-A-2017-8167

SUMMARY OF INVENTION

Technical Problem

However, in order to suppress the generation of the abrasion powder aggregate in the friction material described in Patent Literature 1, a coating step of the filler or the inorganic friction modifier is required in manufacturing, leading to a high manufacturing cost.

The present invention has been made in view of the above circumstances, and an object thereof is to provide a friction material capable of suppressing abnormal noise during wetting without requiring a special step (for example, a coating step) in manufacturing.

Solution to Problem

As a result of intensive studies, the present inventors have invented that when a friction material contains a phosphate-based dispersant as a friction modifier, it is possible to suppress abnormal noise during wetting without requiring a special step (for example, a coating step) in manufacturing. Thus, the present invention has been completed.

That is, the present invention relates to the following <1> to <3>.

<1> A friction material includes: a friction modifier; a binder; and a fibrous material, in which a phosphate-based dispersant is contained as the friction modifier.

<2> The friction material according to <1>, in which a content of the phosphate-based dispersant is 0.2 mass % to 2.0 mass %.

<3> The friction material according to <1> or <2>, in which the phosphate-based dispersant is at least one selected from a group consisting of sodium hexametaphosphate, sodium polyphosphate, and sodium pyrophosphate.

Advantageous Effects of Invention

According to the present invention, it is possible to provide a friction material capable of suppressing abnormal noise during wetting without requiring a special step (for example, a coating step) in manufacturing.

DESCRIPTION OF EMBODIMENTS

Hereinafter, the present invention will be described in detail, but these show examples of desirable embodiments, and the present invention is not specified in these contents.

A friction material of the present invention contains: a friction modifier; a binder; and a fibrous material.

Hereinafter, each component will be described in detail.

<Friction Modifier>

The friction material of the present invention contains a phosphate-based dispersant as the friction modifier.

(Phosphate-based Dispersant)

The phosphate-based dispersant refers to a condensed phosphate.

The condensed phosphate refers to one having two or more orthophosphoric acid ions, has a linear or annular structure, and is widely used as a dispersant used in particle size distribution measurement, dye dispersion, or food additives.

When the friction material of the present invention contains the phosphate-based dispersant, even in a state where moisture is present at an interface between the friction material and a disc rotor which is a counterpart material, the dispersion of an abrasion powder in water is promoted, and the generation of an abrasion powder aggregate can be suppressed. As a result, it is considered that abnormal noise during wetting due to the abrasion powder aggregate, can be suppressed.

In addition, the phosphoric acid group contained in the phosphate-based dispersant has a strong adsorptive force to a metal or a metal oxide. Therefore, it is considered that, in an abrasion powder of the friction material containing the metal or the metal oxide, the phosphate-based dispersant is likely to exhibit an aggregation preventing effect due to repulsion due to steric hindrance, electrostatic repulsion, or the like.

Examples of the phosphate-based dispersant include sodium hexametaphosphate, sodium polyphosphate, sodium pyrophosphate, sodium tetraphosphate, and sodium tripolyphosphate. Among these, from the viewpoint of dispersion promoting of the abrasion powder, sodium hexametaphosphate, sodium polyphosphate, and sodium pyrophosphate are preferred. Sodium hexametaphosphate is more preferred from the viewpoints of sustainability of the dispersion effect and moldability of the friction material.

The content of the phosphate-based dispersant in the entire friction material is preferably 0.2 mass % to 2.0 mass %, more preferably 0.5 mass % to 2.0 mass %, and still more preferably 1.0 mass % to 2.0 mass %. When the content of the phosphate-based dispersant is 0.2 mass % or more, dispersion of the abrasion powder in water can be sufficiently promoted. When the content of the phosphate-based dispersant is 2.0 mass % or less, deterioration of the moldability of the friction material can be suppressed.

(Other Friction Modifiers)

Other friction modifiers are used to impart desired friction characteristics such as abrasion resistance, heat resistance, and fade resistance to the friction material.

Examples of the other friction modifiers include an inorganic filler, an organic filler, an abrasive, and a solid lubricant.

Examples of the inorganic filler include: inorganic materials such as titanates, for example, potassium titanate, lithium titanate, lithium potassium titanate, sodium titanate, calcium titanate, magnesium titanate, and potassium magnesium titanate, barium sulfate, calcium carbonate, calcium hydroxide, vermiculite, and mica; and metal powders of aluminum, tin, and zinc. These inorganic fillers can be used alone or in combination of two or more thereof.

The inorganic filler is preferably used in an amount of 30 mass % to 80 mass %, and more preferably 40 mass % to 70 mass % in the entire friction material.

Examples of the organic filler include various rubber powders (raw rubber powder, tire powder, etc.), cashew dust, tire tread, and melamine dust. These organic fillers can be used alone or in combination of two or more thereof.

The organic filler is preferably used in an amount of 1 mass % to 15 mass %, and more preferably 1 mass % to 10 mass % in the entire friction material.

Examples of the abrasive include alumina, silica, magnesium oxide, zirconia, zirconium silicate, chromium oxide, triiron tetroxide ($Fe_3O_4$), and chromate. These abrasives can be used alone or in combination of two or more thereof.

The abrasive is preferably used in an amount of 1 mass % to 20 mass %, and more preferably 3 mass % to 15 mass % in the entire friction material.

Examples of the solid lubricant include graphite, coke, antimony trisulfide, molybdenum disulfide, tin sulfide, and polytetrafluoroethylene (PTFE). These solid lubricants can be used alone or in combination of two or more thereof.

The solid lubricant is preferably used in an amount of 1 mass % to 20 mass %, and more preferably 3 mass % to 15 mass % in the entire friction material.

The friction modifier is preferably used in an amount of 60 mass % to 90 mass %, and more preferably 70 mass % to 90 mass % in the entire friction material, from the viewpoint of sufficiently imparting the desired friction characteristics to the friction material.

<Binder>

As the binder, various commonly used binders can be used. Specific examples thereof include phenol resins, various elastomer-modified phenol resins, and thermosetting resins such as a melamine resin, an epoxy resin and a polyimide resin.

Examples of the elastomer-modified phenol resin include an acrylic rubber-modified phenol resin, a silicone rubber-modified phenol resin, and a nitrile rubber (NBR)-modified phenol resin. These binders can be used alone or in combination of two or more thereof.

From the viewpoint of moldability of the friction material, the binder is preferably used in an amount of 1 mass % to 20 mass %, and more preferably 3 mass % to 15 mass % in the entire friction material.

<Fibrous Material>

As the fibrous material, various commonly used fibrous materials can be used. Specific examples thereof include an organic fiber, an inorganic fiber, and a metal fiber.

Examples of the organic fiber include an aromatic polyamide (aramid) fiber and a flame-resistant acrylic fiber.

Examples of the inorganic fiber include a biosoluble inorganic fiber, a ceramic fiber, a glass fiber, a carbon fiber, and rock wool. Examples of the biosoluble inorganic fiber include biosoluble ceramic fibers such as a $SiO_2$-CaO-MgO-based fiber, a $SiO_2$-CaO-MgO-$Al_2O_3$-based fiber, a $SiO_2$-MgO-SrO-based fiber, and biosoluble rock wool.

Examples of the metal fiber include a steel fiber. These fibrous materials can be used alone or in combination of two or more thereof.

From the viewpoint of ensuring sufficient strength of the friction material, the fibrous material is preferably used in an amount of 3 mass % to 30 mass %, and more preferably 5 mass % to 20 mass % in the entire friction material.

<Method for Producing Friction Material>

The friction material of the present invention can be produced by a known production process. For example, the friction material can be produced by blending the above components, and subjecting the blended material to steps such as preforming, hot-molding, heating, and grinding according to a usual production method.

A method for producing a brake pad provided with the friction material generally includes the following steps.

(a) a step of molding a pressure plate into a predetermined shape by using a sheet metal press, (b) a step of applying a degreasing treatment, a chemical conversion treatment and a primer treatment to the pressure plate and coating the pressure plate with an adhesive, (c) a step of blending raw materials such as a friction modifier, a binder and a fibrous material, sufficiently homogenizing by mixing, and performing molding at a predetermined pressure at room temperature to prepare a preformed body, (d) a hot-molding step of integrally fixing the preformed body and the pressure plate coated with the adhesive by applying a predetermined temperature and pressure (molding temperature: 130° C. to 180° C., molding pressure: 30 MPa to 80 MPa, molding time: 2 minutes to 10 minutes), and (e) a step of performing after-cure (150° C. to 300° C., 1 hour to 5 hours) and finally performing finishing treatments such as grinding, scorching, and painting.

EXAMPLES

The present invention will be specifically described by way of the following Examples, but the present invention is not limited thereto.

(Examples 1 to 6 and Comparative Example 1)

Compounding materials shown in Table 3 are collectively charged into a mixing agitator and mixed at room temperature for 4 minutes to obtain a mixture. The obtained mixture is subjected to the following (i) preforming, (ii) hot-molding, and (iii) heating and scorching to prepare a friction material.

(i) Preforming

The mixture is charged into a mold of a preforming press and molded at room temperature at 20 MPa for 10 seconds to prepare a preformed body.

(ii) Hot-Molding

The preformed body is charged into a mold for hot-molding, metal plates (pressure plates) coated with an adhesive in advance are stacked, and hot-press molding is performed at 150° C. and 40 MPa for 5 minutes.

(iii) Heating and Scorching

The hot-press molded body is heat-treated at 250° C. for 3 hours and then grinded.

Next, the surface of the hot-press molded body is scorched and finished with a painting to obtain the friction material.

The abnormal noise during wetting and a change in average friction coefficient during wetting (simulation of a dew condensation state) after leaving at a low temperature and high humidity environment are evaluated on the friction materials obtained in Examples 1 to 6 and Comparative Example 1 by the following method.

<Abnormal Noise during Wetting>

Using the friction material obtained as described above, a test is carried out based on conditions shown in Table 1 with an actual vehicle (vehicle type: SUV AT vehicle, vehicle weight: 2,000 kg).

Water is applied to the rotor and the friction material at a rate of 15 L/min for 1 minute for the purpose of simulating the running of the vehicle after washing vehicle or in rain.

TABLE 1

| | | Initial braking | | Control | | |
|---|---|---|---|---|---|---|
| No. | Item | temperature [° C.] of disc pad | Initial speed [km/h] | Deceleration [m/s²] | Hydraulic pressure [MPa] | Braking times |
| 1 | Burnishing | 120 | 60 | 3.6 | — | 50 |
| 2 | Water application | (Water spraying amount: 15 L/min × 1 min) | | | | |
| 3 | Braking condition 1 | 30 | 10 | — | 2.0 | 10 |
| 4 | Drying (water repellent) | 120 | 60 | 3.6 | — | 10 |
| 5 | Water application | (Water spraying amount: 15 L/min × 1 min) | | | | |
| 6 | Braking condition 2 | 30 | 10 | — | 4.0 | 10 |

Among the abnormal noise generated in braking for 10 times under the braking condition 1 and the braking condition 2, the noise that the sound is the most significant is determined by sensory evaluation, and evaluated based on the following criteria. The results are shown in Table 3. The sensory evaluation is performed by one engineer who specializes in an actual vehicle test for automobile manufacturer's designation based on the evaluation criteria.

◎: No abnormal noise generated
•: Slight sound (within an allowable level even generated)
Δ: Medium sound (noticeable level)
×: Large sound (unpleasant sound)

<Change in Average Friction Coefficient during Wetting (Simulation of Dew Condensation State) after Leaving at Low Temperature and High Humidity Environment>

The friction material obtained as described above is used to conduct a test based on the conditions shown in Table 2 using a full-sized dynamometer.

For the purpose of simulating the dew condensation state, 3 mL of water spray is sprayed on each of an inner friction surface and an outer friction surface.

TABLE 2

| | | | Initial braking | | | Control | | |
|---|---|---|---|---|---|---|---|---|
| No. | Item | Environment condition | temperature [° C.] of disc rotor | Initial speed [km/h] | Final speed [km/h] | Deceleration [m/s²] | Hydraulic pressure [MPa] | Braking times |
| 1 | Burnishing | 10° C., 40% | 60 | 40 | 3 | 1.5 | — | 1000 |
| 2 | Braking condition 1 | | 30 or lower | 10 | 0 | — | 0.5, 1.0, 1.5 | 1 in each hydraulic pressure |
| 3 | 8-hour leaving | 10° C., 80% | — | — | — | — | — | — |
| 4 | Braking condition 2 | | 30 or lower | 10 | 0 | — | 0.5, 1.0, 1.5 | 1 in each hydraulic pressure |
| 5 | Spaying with water spray | | — | — | — | — | — | — |
| 6 | Braking condition 3 | | 30 or lower | 10 | 0 | — | 0.5, 1.0, 1.5 | 1 in each hydraulic pressure |

The average friction coefficient under the braking condition 1 is compared with the average friction coefficient under the braking condition 2 after being left for 8 hours, and the average friction coefficient under the braking condition 1 is compared with the average friction coefficient under a braking condition 3 after spraying with water spray. The rate of change in the average friction coefficient after being left at a low temperature and high humidity environment and after spraying with water spray is calculated according to the following formulas and evaluated based on the following criteria. The results are shown in Table 3.

[Math. 1]

$$\text{RATE OF CHANGE [\%] IN AVERAGE FRICTION COEFFICIENT AFTER BEING LEFT AT LOW TEMPERATURE AND HIGH HUMIDITY ENVIRONMENT} = \frac{\text{AVERAGE FRICTION COEFFICIENT UNDER BRAKING CONDITION 2} - \text{AVERAGE FRICTION COEFFICIENT UNDER BRAKING CONDITION 1}}{\text{AVERAGE FRICTION COEFFICIENT UNDER BRAKING CONDITION 2}} \times 100$$

-continued $$\text{RATE OF CHANGE [\%] IN AVERAGE FRICTION COEFFICIENT AFTER SPRAYING WITH WATER SPRAY} = \frac{\text{AVERAGE FRICTION COEFFICIENT UNDER BRAKING CONDITION 3} - \text{AVERAGE FRICTION COEFFICIENT UNDER BRAKING CONDITION 1}}{\text{VERAGE FRICTION COEFFICIENT UNDER BRAKING CONDITION 3}} \times 100$$

⊚: less than ±5%

•: ±5% or more and less than ±10%

Δ: ±10% or more and less than ±15%

×: ±15% or more

TABLE 3

| | | | (mass %) | Example 1 | 2 | 3 | 4 | 5 | 6 | Comparative Example 1 |
|---|---|---|---|---|---|---|---|---|---|---|
| Blending composition | Friction modifier | Binder | Phenol resin | 8 | 8 | 8 | 8 | 8 | 8 | 8 |
| | | Organic filler | Cashew dust | 4 | 4 | 4 | 4 | 4 | 4 | 4 |
| | | | Rubber dust | 1 | 1 | 1 | 1 | 1 | 1 | 1 |
| | | Inorganic filler | Calcium hydroxide | 3 | 3 | 3 | 3 | 3 | 3 | 3 |
| | | | Mica | 5 | 5 | 5 | 5 | 5 | 5 | 5 |
| | | | Potassium titanate | 18 | 18 | 18 | 18 | 18 | 18 | 18 |
| | | | Barium sulfate | 31.8 | 31.5 | 31 | 30 | 30 | 30 | 32 |
| | | | Zinc powder | 2 | 2 | 2 | 2 | 2 | 2 | 2 |
| | | | Sodium hexametaphosphate | 0.2 | 0.5 | 1.0 | 2.0 | — | — | — |
| | | | Sodium polyphosphate | — | — | — | — | 2.0 | — | — |
| | | | Sodium pyrophosphate | — | — | — | — | — | 2.0 | — |
| | | Abrasive | Zirconium silicate | 6 | 6 | 6 | 6 | 6 | 6 | 6 |
| | | | Triiron tetroxide | 5 | 5 | 5 | 5 | 5 | 5 | 5 |
| | | Solid lubricant | Graphite | 6 | 6 | 6 | 6 | 6 | 6 | 6 |
| | | | Tin sulfide | 3 | 3 | 3 | 3 | 3 | 3 | 3 |
| | | Fibrous material | Aramid fiber | 3 | 3 | 3 | 3 | 3 | 3 | 3 |
| | | | Biosoluble inorganic fiber | 4 | 4 | 4 | 4 | 4 | 4 | 4 |
| | | | Total | | | | 100 | | | |
| Evaluation | Actual vehicle | | Abnormal noise evaluation during wetting [sensory evaluation] | Medium sound | Slight sound | No sound | No sound | Medium sound | Medium sound | Large sound |
| | Dynamo | | Average friction coefficient after leaving at low temperature and high humidity environment, rate of change [%] | 12.2 | 9.1 | 6.3 | 3.8 | 13.0 | 12.8 | 15.2 |
| | | | Average friction coefficient after leaving at low temperature and high humidity environment + spraying with water spray, rate of change [%] | 14.8 | 13.4 | 9.5 | 7.7 | 14.3 | 13.2 | 15.9 |
| | Determination | | Abnormal noise evaluation during wetting | Δ | ○ | ⊚ | ⊚ | Δ | Δ | × |
| | | | Average friction coefficient after leaving at low temperature and high humidity environment, rate of change | Δ | ○ | ○ | ⊚ | Δ | Δ | × |
| | | | Average friction coefficient after leaving at low temperature and high humidity environment + spraying with water spray, rate of change | Δ | Δ | ○ | ○ | Δ | Δ | × |

As seen from the results in Table 3, the friction materials according to Examples 1 to 6 can suppress abnormal noise during wetting.

Although the present invention has been described in detail and with reference to particular embodiments, it will be apparent to those skilled in the art that various changes and modifications can be made without departing from the spirit and scope of the invention. The present application is based on a Japanese Patent Application (Japanese Patent Application No. 2019-194388) filed on Oct. 25, 2019, and the content thereof is incorporated herein as reference.

The invention claimed is:

1. A friction material comprising:
a friction modifier;
a binder; and
a fibrous material, wherein
the friction modifier comprises:
    a phosphate-based dispersant, and
    an abrasive,
    wherein a content of the phosphate-based dispersant is 0.2 mass % to 2.0 mass %.

2. The friction material according to claim 1, wherein the phosphate-based dispersant is at least one selected from a group consisting of sodium hexametaphosphate, sodium polyphosphate, and sodium pyrophosphate.

3. The friction material according to claim 1, wherein the phosphate-based dispersant is at least one selected from a group consisting of sodium hexametaphosphate, sodium polyphosphate, and sodium pyrophosphate.

4. The friction material according to claim 1, wherein a content of the abrasive is 1.0 mass % to 20.0 mass %.

5. The friction material according to claim 1, wherein a content of the abrasive is 3.0 mass % to 15.0 mass %.

6. The friction material according to claim 1, wherein a content of the abrasive is 1.0 mass % to 11.0 mass %.

7. The friction material according to claim 1, wherein the abrasive is at least one selected from a group consisting of alumina, silica, magnesium oxide, zirconia, zirconium silicate, chromium oxide, triiron tetroxide, and chromate.

8. The friction material according to claim 1, wherein the abrasive is at least one selected from a group consisting of zirconium silicate and triiron tetroxide.

9. The friction material according to claim 1, wherein the content of the phosphate-based dispersant is 0.5 mass % to 2.0 mass %.

10. The friction material according to claim 1, wherein the content of the phosphate-based dispersant is 1.0 mass % to 2.0 mass %.

* * * * *